Aug. 18, 1959 H. L. BLASBALG 2,900,499
RADIO RECEIVER HAVING MODULATION INDICATOR
OPERATED BY AUTOMATIC GAIN CONTROL
BIAS AND DEMODULATED SIGNAL
Filed June 11, 1957
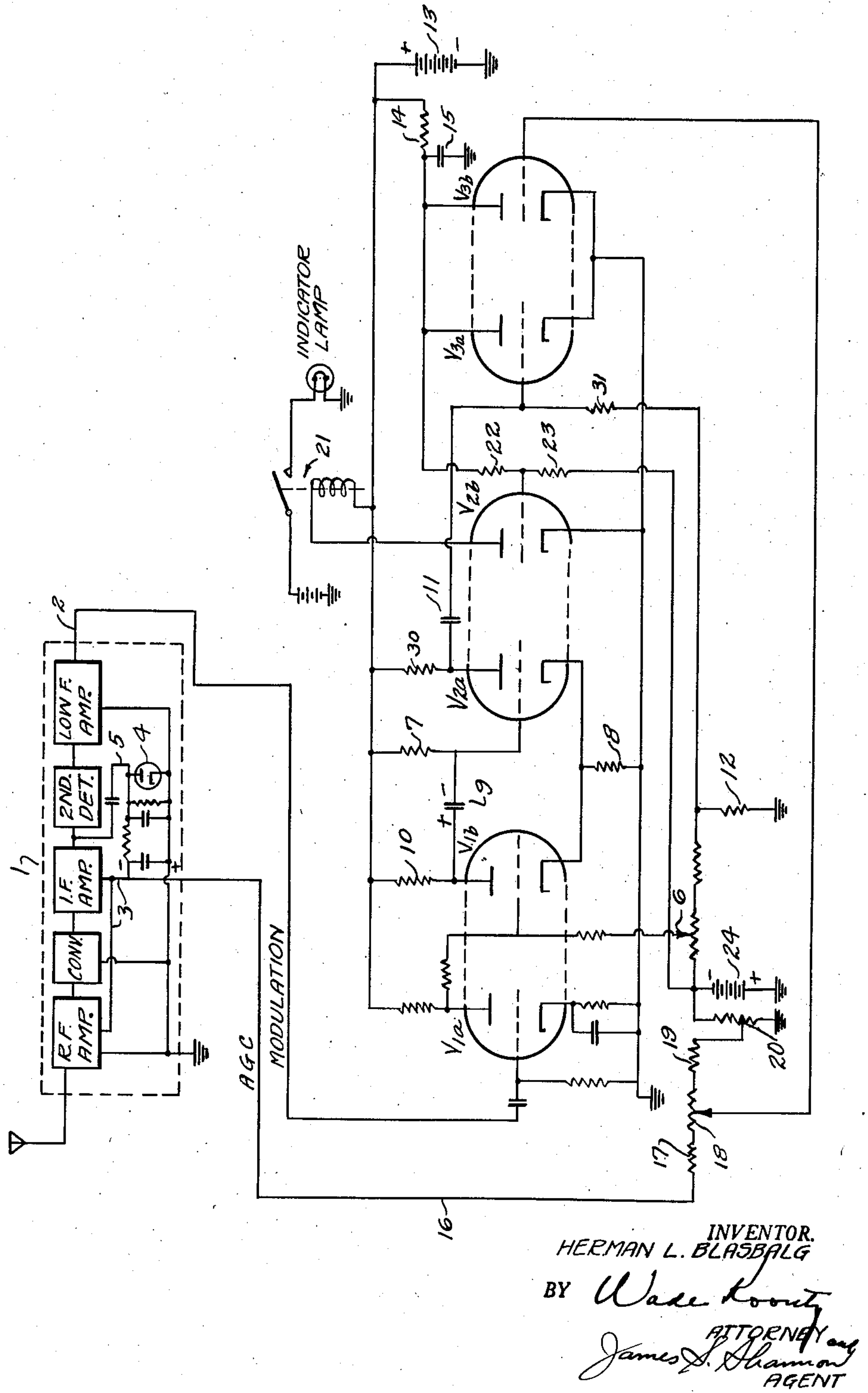
INVENTOR.
HERMAN L. BLASBALG
BY Wade Koontz
ATTORNEY and
James S. Shannon
AGENT

United States Patent Office 2,900,499

Patented Aug. 18, 1959

2,900,499

RADIO RECEIVER HAVING MODULATION INDICATOR OPERATED BY AUTOMATIC GAIN CONTROL BIAS AND DEMODULATED SIGNAL

Herman L. Blasbalg, Baltimore, Md., assignor to the United States of America as represented by the Secretary of the Air Force Application June 11, 1957, Serial No. 665,106

5 Claims. (Cl. 250—20)

It is the purpose of this invention to provide apparatus for use in conjunction with a radio receiver to indicate the reception of an unmodulated carrier wave or a carrier wave having modulation below a specified amount. The operation of the apparatus is independent of the modulating waveform and, although intended for use with amplitude modulated waves, may also be used with waves having other forms of modulation. The device is designed to give a simple "yes" or "no" answer and therefore is capable of consistent results.

The apparatus utilizes the AGC (automatic gain control) voltage and modulation output of the receiver to actuate, through a control circuit, a relay having its contacts connected in a suitable indicating circuit. The relay remains unenergized in the absence of AGC and modulation voltages and in the presence of an AGC voltage and a modulation voltage exceeding a specified magnitude; however, in the presence of an AGC voltage and a modulation voltage smaller than the specified magnitude the relay is energized closing the indicator circuit.

A more detailed description of the invention will be given in connection with the accompanying drawing which shows the apparatus used with a receiver for amplitude modulated waves.

Referring to the drawing, 1 represents any superheterodyne receiver for amplitude modulated waves having means for demodulating the received waves and producing the modulating wave on an output conductor 2, and having an AGC circuit producing a negative gain control voltage for application to the radio frequency and intermediate frequency amplifier stages of the receiver over conductor 3 in conventional manner. The AGC voltage is usually produced by the rectification of the intermediate frequency wave at the output of the intermediate frequency amplifier, which wave is applied to the AGC rectifier 4 over conductor 5. A separate rectifier may be used as shown, or the AGC voltage may be derived from the second detector of the receiver. In any event the AGC voltage is a negative voltage directly related in magnitude to the magnitude of the received carrier and operating, through control of the gain of the preceding radio and intermediate frequency amplifiers, to maintain the intermediate frequency carrier level at the input to the second detector constant. With the carrier level held constant the amplitude of the modulation signal on conductor 2 is proportional to the percent of modulation, this percentage being the ratio of the modulation function amplitude to the peak carrier amplitude multiplied by 100. Under this condition the modulation indicator can operate on a modulation percentage basis.

The modulation indicator constitutes the remainder of the drawing. Tube V1*a*, which receives the modulation signal on its control grid, is an amplifier having its output directly coupled to the grid of tube V1*b*. Tubes V1*b* and V2*a* are interconnected in a slicer circuit which operates to produce a positive pulse at the anode of V2*a* that is initiated whenever the input to V1*b* exceeds a predetermined potential, termed the slicing potential and determined by the setting of contact 6, and that persists for the length of time that the V1*b* input is above this potential. Representative components and values for this circuit are:

| | |
|---|---|
| Tubes | 12AT7. |
| Resistor 10 | 15,000 ohms. |
| Resistor 8 | 330 ohms. |
| Resistor 7 | 2.7 megohms. |
| Resistor 30 | 3300 ohms. |
| Condenser 9 | 0.5 mfd. |

Tube V2*a* is normally conductive, due to its grid being connected to positive potential through resistor 7, and tube V1*b* is normally biased beyond cut-off by the voltage drop across resistor 8 through which the V2*a* current flows. In this stable condition of the circuit condenser 9 has its maximum charge, having previously charged through resistor 10, the grid-cathode path of V2*a* and resistor 8.

With the circuit in the above described normal state, if the positive-going modulating signal applied to the grid of V1*b* from V1*a* drives the grid above the cut-off potential the resulting conduction in V1*b* initiates an instantaneous transition to a condition in which V1*b* is conducting and V2*a* is cut off. This rapid transition is due to the regenerative feedback that exists from the output of V1*b* to its input through V2*a* and resistor 8. After the modulating signal on the grid of V1*b* has reached its peak and started to fall conduction in V1*b* decreases causing its anode potential to rise and, along with it, the potential of the grid of V2*a*. When the grid of V2*a* reaches cut-off the resulting conduction in V2*a* initiates another rapid transition back to the original state with V1*b* conductive and V2*a* cut off. This rapid transition also results from regeneration in the circuit, this time from the anode circuit of V2*a* to its grid through resistor 8 and tube V1*b*. Hence the output signal of the slicer circuit at the anode of V2*a* is a square wave whose duty cycle is proportional to the length of time that the input signal spends above the slicing potential determined by the position of contact 6. The time constant of condenser 9 and resistor 7 is made to exceed the longest time interval of the input to V1*b* so that no appreciable change occurs in the voltage of the condenser during a cycle of operation of the slicer circuit. The discharging of condenser 9, therefore, plays no part in the triggering of the circuit, the triggering between both conditions being accomplished by the input waveform.

The amplitude of the signal output of amplifier V1*a* required to trigger the circuit into a cycle of operation is determined by the setting of contact 6. If this contact is set so that the negative bias of the V1*b* grid relative to the cathode is only slightly greater than the cut-off bias, a very small output from tube V1*a* may be sufficient to initiate conduction in V1*b*. As the negative bias of the V1*b* grid is increased the signal amplitude required to initiate conduction increases equally.

In going through the above described cycle the V1*b*—V2*a* circuit, as stated above, generates a positive pulse on the anode of V2*a*. This pulse is applied to the grid of V3*a* through condenser 11 and across resistor 31, the values of which elements may, for example, be 0.1 mfd. and 1 megohm. This tube is normally biased beyond cut-off by the drop across resistor 12 but conducts during the positive pulse. Tube V3*a* has its anode directly connected to the anode of V3*b* and its cathode directly connected to the cathode of V2*b* so that the two tubes are in parallel. The two anodes are connected to the positive terminal of direct current source 13 through resistor 14 while the two cathodes are connected to the grounded negative terminal of this source. The condenser 15 is connected in shunt to V3*a* and V3*b* and has such capacitance as to provide with resistance 14 a time constant of about 0.5 second. For example, condenser 15 may have a capacitance of 0.5 microfarad and resistance 14 a value of $10^6$ ohms.

The bias on the grid of V3*b* is controlled by the AGC voltage produced by the receiver. This negative voltage is applied over conductor 16 to the left hand end of resistor 17, the other end of which is connected through potentiometer 18 and resistor 19 to a point 20 of comparatively low negative potential. The arrangement is such that, with potentiometer 18 properly set, V3*b* is fully conductive when no signal is being received and the AGC voltage is zero, but is cut off by the AGC voltage in the presence of a received signal. The resistance values of resistors 17, 18 and 19 should be comparatively high in order not to load the AGC circuit of the receiver.

The remaining tube in the circuit, V2*b*, operates in response to the potential across condenser 15 to control the energization of relay 21 which has its coil in the anode circuit. With both V3*a* and V3*b* nonconductive the potential across condenser 15 can rise from zero to a value approaching that of source 13 in about 0.5 second which, as stated above, is the time constant of the charging circuit. Resistors 22 and 23 are so proportioned with respect to this voltage and the voltage of source 24 that, with this condenser voltage, the conduction in V2*b* is just sufficient to close the contacts of relay 21. With this arrangement, any appreciable conduction in V3*a* or V3*b* will hold the condenser voltage below the above specified value and prevent energization of the relay. The contacts of the relay may be included in any control or indicator circuit such as the simple indicator lamp circuit shown.

In describing the operation of the circuit, first consider that no signal is being received by the receiver 1 and that contact 6, as always, is set so that the grid of V1*b* has a potential below the cut-off value. In the absence of a signal the modulation on line 2 is zero and therefore no signal is applied to the grid of V1*b*. Consequently no conduction occurs in this tube and the V1*b*—V2*a* slicer circuit is not triggered. With no cycling of the slicer circuit no positive pulses are applied to the grid of V3*a* and this tube remains nonconductive. However, the AGC voltage on line 16 is also zero and under this condition tube V3*b* is conductive and its current flowing through resistor 14 holds the potential across condenser 15 well below the magnitude required to actuate relay 21. The indicator lamp therefore is not energized for the no-signal condition.

When a modulated carrier is received by receiver 1 a modulation signal appears on conductor 2 and a negative AGC voltage on conductor 16. The AGC voltage renders V3*b* nonconductive. The modulation signal, after amplification by V1*a*, is applied to the grid of V1*b*. As stated above, the potential of this grid is set by contact 6 below the cut-off point of tube V1*b* when the slicer is in its normal stable state (V1*b* nonconductive). If the amplitude of the modulating signal, peak or R.M.S. as desired, required to raise the grid of V1*b* to the cut-off point is designated $M_0$ and the actual modulation signal amplitude is designated M, then when M is greater than $M_0$ the V1*b*—V2*a* slicer circuit is repeatedly triggered and a series of positive pulses are applied to the grid of V3*a* causing this tube to have repeated periods of conduction. Since V3*a*, when conductive, substantially short circuits condenser 15, this condenser is repeatedly discharged and its voltage prevented from reaching the magnitude required to actuate relay 21. No indication is given therefore when M exceeds $M_0$. On the other hand, when M is less than $M_0$ the V1*b* grid never rises above the cut-off potential and the slicer remains in its stable state with V2*a* continuously conductive. Under this condition no positive pulses are applied to the V3*a* grid and this tube remains cut off. With both V3*a* and V3*b* nonconductive condenser 15 charges after a short while to a potential sufficient to actuate relay 21 and energize the indicator lamp.

The circuit therefore indicates the presence of a received carrier having a modulation M less than $M_0$. $M_0$ may be set to any desired value by adjustable contact 6. By making $M_0$ sufficiently small, the circuit, for all practical purposes, can be made to indicate unmodulated carriers only.

Since, as already stated, the amplitude of the carrier at the output of the intermediate frequency amplifier of the receiver remains constant due to the AGC circuit, $M_0$ may represent the percentage modulation of the carrier as well as the amplitude of the modulation for amplitude modulated waves. For frequency or phase modulated carriers, however, $M_0$ would bear no relation to the percentage modulation.

I claim:

1. For use with a radio receiver having means for producing an automatic gain control voltage and having a modulation output, apparatus for indicating the presence of a received carrier wave having a modulation less than a predetermined amount, said apparatus comprising: an indicator, means connected to said receiver and said indicator and energized by said automatic gain control voltage for operating said indicator to produce an indication in the presence of an automatic gain control voltage, and means connected to said receiver and to said indicator operating means and energized by said modulation output for disabling said indicator operating means when said modulation exceeds said predetermined amount.

2. For use with a radio receiver having means for producing an automatic gain control voltage in the presence of a received carrier wave and having a modulation output, apparatus for indicating the presence of a received carrier wave having a modulation less than a predetermined amount, said apparatus comprising: a condenser, a resistor, means for charging said condenser through said resistor, a normally conductive device and a normally nonconductive device connected in shunt to said condenser, means responsive to said automatic gain control voltage for rendering said normally conductive device nonconductive, means responsive to said modulation for rendering said normally nonconductive device conductive when said modulation exceeds said predetermined amount, and an indicator circuit energized by the voltage across said condenser.

3. For use with a radio receiver having means for producing an automatic gain control voltage in the presence of a received carrier wave and having means for demodulating a received carrier wave to produce the modulation, apparatus for indicating the presence of a received carrier wave having a modulation less than a predetermined amount, said apparatus comprising: a condenser; a resistor; means for charging said condenser through said resistor; a first electron discharge device having an anode, a cathode and a grid, and having its anode-cathode path connected in shunt to said condenser; a second electron discharge device having an anode, a cathode and a grid, and having its anode-cathode path connected in shunt to said condenser; means normally biasing the grid of said first electron discharge device for anode conduction; means normally biasing the grid of said second device for anode current cut-off; means applying said automatic gain control voltage to the grid of said first tube in such direction and magnitude as to cause anode current cut-off; means operative when said modulation exceeds said predetermined amount to render sufficient anode conduction in said second electron discharge to maintain said condenser in a state of low charge; and an indicator circuit energized by the voltage across said condenser.

4. For use with a radio receiver having means for producing an automatic gain control voltage in the presence of a received carrier wave and having means for demodulating a received carrier wave to produce the modulation, apparatus for indicating the presence of a received carrier wave having a modulation less than a predetermined amount, said apparatus comprising: a condenser; a resistor; means for charging said condenser through said resistor; a first electron discharge device having an anode, a cathode and a grid, and having its anode-cathode path connected in shunt to said condenser; a second electron discharge device having an anode, a cathode and a grid, and having its anode-cathode path connected in shunt to said condenser; means normally biasing the grid of said first electron discharge device for anode conduction; means normally biasing the grid of said second device for anode current cut-off; means applying said automatic gain control voltage to the grid of said first tube in such direction and magnitude as to cause anode current cut-off; a slicer circuit producing a positive pulse in each cycle of operation; means for applying said positive pulse to the grid of said second electron discharge device; means responsive to said modulation and coupled to said slicer circuit for triggering said slicer whenever said modulation exceeds said predetermined amount; and an indicator circuit energized by the voltage across said condenser.

5. For use with a radio receiver having means for producing an automatic gain control voltage in the presence of a received carrier wave and having means for demodulating a received carrier wave to produce the modulation, apparatus for indicating the presence of a received carrier wave having a modulation less than a predetermined amount, said apparatus comprising: a condenser; a resistor; means for charging said condenser through said resistor; a first electron discharge device having an anode, a cathode and a grid, and having its anode-cathode path connected in shunt to said condenser; a second electron discharge device having an anode, a cathode and a grid, and having its anode-cathode path connected in shunt to said condenser; means normally biasing the grid of said first electron discharge device for anode conduction; means normally biasing the grid of said second device for anode current cut-off; means applying said automatic gain control voltage to the grid of said first tube in such direction and magnitude as to cause anode current cut-off; a pair of electron tubes, each having an anode, a cathode and a control grid, connected in a slicer circuit producing one positive pulse in each cycle of operation; means for applying said positive pulse to the grid of said second electron discharge; means for applying said modulation and an adjustable bias to the grid of one of the tubes in said slicer circuit for triggering said slicer whenever said modulation exceeds said predetermined amount as determined by the setting of said adjustable bias; and an indicator circuit energized by the voltage across said condenser.

References Cited in the file of this patent

UNITED STATES PATENTS

| | | |
|---|---|---|
| 2,085,408 | Barton | June 29, 1937 |
| 2,144,605 | Beers | Jan. 24, 1939 |
| 2,297,752 | Dumont et al. | Oct. 6, 1942 |